(No Model.)

R. BUCHANAN.
TIRE.

No. 602,935. Patented Apr. 26, 1898.

Witnesses

Inventor
Robert Buchanan,
by Dodge and Sons,
Attys.

UNITED STATES PATENT OFFICE.

ROBERT BUCHANAN, OF BOOTLE, ENGLAND.

TIRE.

SPECIFICATION forming part of Letters Patent No. 602,935, dated April 26, 1898.

Application filed October 18, 1897. Serial No. 655,609. (No model.)

*To all whom it may concern:*

Be it known that I, ROBERT BUCHANAN, a subject of the Queen of Great Britain, residing at Bootle, in the county of Lancaster, England, have invented certain new and useful Improvements in or Relating to Tires, of which the following is a specification.

This invention relates to tires for the wheels of road-vehicles, and has for its object to produce a tire which will not be liable to be punctured by sharp articles met with on the surface of the road. With this end in view I form my tire of an imperforate metal tube made in two parts or halves, the two halves being coupled together and air cushions or springs inserted between to secure the necessary elasticity.

The invention will be understood from the following description, reference being had to the accompanying drawings, in which—

Figure 1:
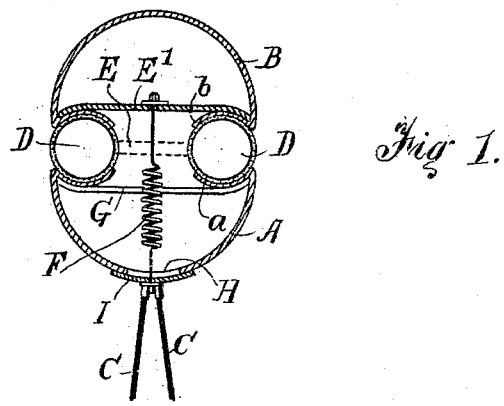
Figure 2:
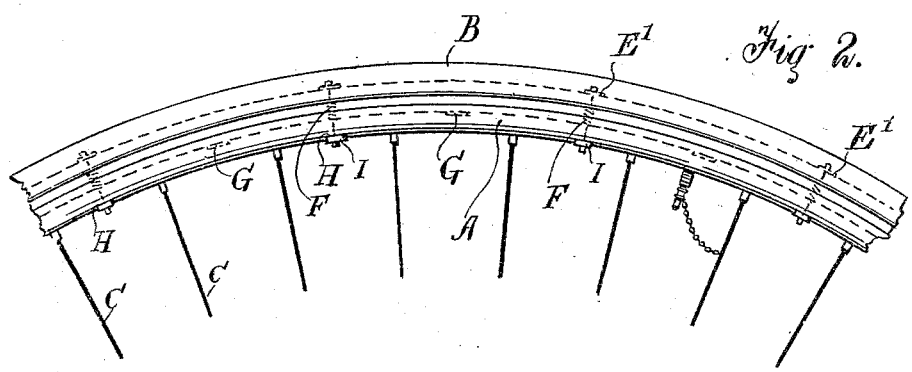

Figure 1 is a cross-section of my tire; Fig. 2, a front elevation of a segment thereof.

In the figures, A and B are the two parts or halves of the resilient metal tube, A being the part to which the spokes C are attached, hereinafter called the "rim," and B the portion which bears upon the surface of the roadway, hereinafter called the "tread." Both portions A and B, or the part B only, are of elastic imperforate metal made up into an entire ring, the part B being of larger diameter than the part A, so that it can be superimposed around the part A, that is passed completely round it circumferentially and leave a space between into which is inserted the annular air-cushions D, having means for inflating them with air. The two parts A and B are flanged at $a$ $b$ to receive the air-cushions.

E is an air-tube connecting the two air-cushions together, so that they can be inflated simultaneously by one operation of the pump. These cushions D, when inflated, keep the tread B concentric with the rim A and also resist side play.

E' are cross-pieces bearing on the flange $b$, and F spring-couplings which pass through the cross-pieces E' and through the rim A at intervals between the spokes, so that by tightening up the nut on the outside the two parts will be firmly secured together. These spring-couplings F and cross-pieces E' are located at intervals around the tire.

The spokes C are fastened direct to the rim A, as shown, or in any other suitable manner. G are cross-pieces alternating with the cross-pieces E' to strengthen the rim A and support flanges. At intervals in the rim A I provide openings H. These openings facilitate the two parts A and B being fastened together when manufacturing the tire, as when the tread B, with its cross-pieces E' and coupling F, fitted thereto, is superimposed on and around the rim the operator can, by passing a tool through the openings H, lay hold of the end of the coupling and draw it through. The covering-plates I are then inserted over the openings, with the end of the coupling F projecting through holes thereof. A nut is put on the screwed end of the coupling with a washer between it and the plate and the nut screwed up. The parts A and B are by this means firmly fastened together; but as the coupling F is an elastic one it allows for movement of the tread B independently of the rim A, so that vibration can be absorbed by the air-cushions D.

In thus describing my invention I wish it to be understood that I do not confine myself to pneumatic cushions, as, if desired, springs may be used instead, located either radially or circumferentially. In the latter case the springs are by preference formed in sections or lengths and placed all around the tire between the two parts A and B, or if placed radially they are formed of a series of springs located near together and held in position by studs or in any other suitable manner.

It must be understood that the spring-coupling F could be dispensed with, if desired, the space between the tread and rim in that case being of such form that when either the air-cushions are inserted and inflated or the spring interposed within the space a tight joint is formed between the rim and tread.

I declare that what I claim is—

1. A tire made of a metal rim and outer non-puncturable tread of larger diameter than the rim so as to pass completely around it circumferentially and air cushions or springs interposed in the space between, in combination with spring-couplings, one end of which is fastened to the outer tread inside, and the other passed through a hole in the rim and tightened up by a nut on the outside, whereby a tight joint between the tread and rim is obtained while allowing for a movement of the tread in absorbing vibration when traveling along a road, substantially as described.

2. In tires of the kind described, coupling together the two parts of the tire by means of spring-couplings, located at intervals all around the tire, and so arranged that while holding the two halves together they will freely allow of vibration being absorbed by the air cushions or springs located between the two parts of the tube substantially as set forth.

3. In a tire, the combination of a rim A provided with concave seats $a$; tread B provided with oppositely-disposed seats $b$; inflatable tubes D mounted in said seats; a plate E' extending across the seats $b$ and bearing upon the upper sides thereof; and means for connecting said plate with the rim, substantially as described.

4. In a tire, the combination of a rim A provided with concave seats $a$; tread B provided with oppositely-disposed seats $b$; tubes D mounted in said seats; and an air-tube connecting the tubes D.

5. In a tire, the combination of a rim A provided with concave seats $a$; tread B having oppositely-disposed seats $b$; air-tubes D mounted in said seats; a plate E' extending across the upper part of seats $b$; and a spring connection between said plate and the rim.

In testimony whereof I have signed my name to this specification in the presence of two subscribing witnesses.

ROBT. BUCHANAN.

Witnesses:
G. C. DYMOND,
W. H. BEESTON.